Dec. 29, 1964 F. P. NETZNIK 3,163,720

MAGNETIC HEAD

Filed Feb. 5, 1959

INVENTOR:
FREDERICK P. NETZNIK

BY [signature]

ATT'Y

3,163,720
MAGNETIC HEAD

Frederick P. Netznik, Skokie, Ill., assignor to Webcor, Inc., Chicago, Ill., a corporation of Illinois Filed Feb. 5, 1959, Ser. No. 791,393
2 Claims. (Cl. 179—100.2)

This invention relates to an apparatus and the method of construction thereof; more particularly it relates to an improved apparatus for use in magnetic tape recording and reproducing equipment.

Magnetic tape recording and reproduction is accomplished by passing a magnetic tape across a gap or separation in a magnetic core. Two of the prime requisites of a tape recorder head assembly are the voltage output in multivolts and the frequency response in decibels down. Both of these characteristics are a function of the effective width of the gap at the tape surface between the pole pieces and the thickness of the pole pieces at the point of closest proximity. To obtain high resolution in a tape recording head the gap between the opposite halves of the magnetic core must be extremely small and uniform, and the core pieces at gap sharp cornered at the working face and equally thin at adjacent edges.

For example, gap sizes of the order of a few microns are required at frequencies of 15,000 cycles per second with slow tape speeds of 3¾ inches per second. However, the gap must be sufficiently large to result in fringe effects which will permit the magnetic circuit to be partially closed by the magnetic material on the moving tape as it passes over the gap. Changes in the magnetic condition of the moving tape interact with the magnetic circuit of the pick-up head at the gap to produce changes in core flux. In actuality during recording the magnetostrictive force that sensitizes the iron oxide on the tape surface is performed only at the far edges of the gap as the tape travels, i.e. the pole edge at the gap that is the last to be contacted by the tape in its movement. A proper gap size for a high resolution recorder, consequently, falls within very narrow tolerances depending upon frequency range; magnetic properties of the pole pieces and the tape; the resolution desired; and other factors.

Heretofore, magnetic recording head gaps have been prepared by machining a slot in the pole pieces or assembling previously machined pole pieces within a rigid mechanical mounting. The resulting gap may be left open or it may be filled with a suitable non-magnetic material. Variations in uniformity of gap and its function have occurred. For example, dimensional variations of only a micron or two between the pole pieces at either end or throughout will affect the quality of the work done by the recording head. Moreover, a stamped or coined shoe tends to have rounded corners and edges as the natural result of the incomplete flow of material in this type of operation. Sintered shoes have been tried but are expensive.

With the continuing increase in frequency range of magnetic recorder applications, and the ever present desire for better resolution, the demands for large scale production precision magnetic gaps of extremely small dimension and tolerances has exceeded commonly used commercial production machine tools and methods. Similarly, the construction of recording heads by means of carefully assembling numerous small parts for rigid mounting, fails to meet the standards for tolerances, rigidity, smallness of dimensions and ruggedness. It is quite expensive and difficult to assemble various small parts of a magnetic-recording head in such a way that they can be rigidly and permanently fastened together and the price of the few good ones obtained must reflect the cost of the useless rejects incurred. Either tolerances with permanent assemblies are not maintained and cannot be corrected, or distortion in handling or during operation may occur which are difficult to repair.

My invention provides a magnetic tape recording head assembly constructed of a minimum of small parts which are uniformly made with inexpensive die stamping techniques. The parts are machined square and planar at the gap faces and plated. The parts are then supported in a die under stress with the gap faces plane parallel to maintain their correct relationship, fused together for permanency and then cast embedded in epoxy to form a unitary head. The working faces are then ground down to provide a precision gap which is established and maintained within strict tolerances in commercial production, yet is inexpensive and simple to produce.

One object of the invention is to provide economically a precision magnetic recorder head assembly for high resolution magnetic tape recording and reproducing.

Another object of the invention is to provide a magnetic recorder head assembly having a precision magnetic gap of any desired width and thickness regardless of the smallness of dimension desired.

Another object of the invention is to provide an improved method of assembling small precision metal parts having various magnetic properties into an improved rigid unitary magnetic recorder head assembly.

The invention is characterized by an ultra quality magnetic recording head assembly possessing precision spacing of the pole pieces and great rigidity and having a mechanical simplicity which is readily adapted to mass production techniques.

These and other objects and advantages of the improved magnetic recorder head assembly will be apparent from the following illustrations, specification and claims.

My invention is, briefly, a magnetic tape recorder head assembly comprising two essentially J shaped Mu-metal pole pieces, each pole being an integral stamping with the gap edge on the toe of the shoe portion thinned and faced plane and square. One or both of the two gap edges are provided with a microscopic uniform layer or film of low magnetic permeability metal preferably by electro plating. The sole pieces are identical each preferably having two parallel core arms extending from opposite edges of the shoe portion at the heel thereof and in their assembly a recessed die fixture or bracket is employed to receive the shoes snugly therein with outside faces down and toes together. A plate is then dropped on top of the back sides and pressed downwardly to crowd the toes together and dispose the shoes in correct orientation. The plate is clamped in its position with the sole pieces in fixed position and with the gap edges urged into contact with each other as spaced solely by said film. Under these conditions the elements are soldered together with all interstices filled with solder to provide a permanent assembly and then this assembly is vested in a thermo setting plastic with or without the coils in place and faced off to a desired depth as gaged from its outside face. Cavities around the core arms can be left to receive the coils if desired.

Thereafter, if the head is to be used for monaural purposes, the unit is sliced longitudinally of the sole and normal to the gap to provide two heads of identical characteristics, one for seaming one track on the tape in one direction and the other for the other track in the other direction on a two-way tape recorder. On the other hand if the head is to be used for stereophonic application, instead of slicing in two, the face of the head is slit longitudinally merely enough to separate the Mu-metal and a double cross talk shield assembly is soldered in place.

My invention is more particularly described and illustrated by the accompanying drawings wherein.

Figure 1:
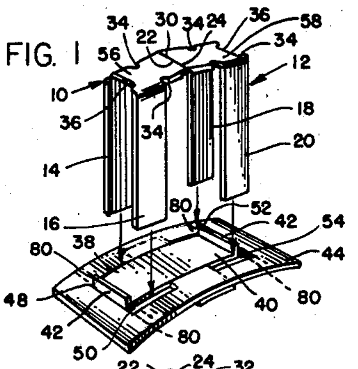
FIG. 1 is an exploded perspective view of the component parts of my magnetic recorder head prior to being assembled.
Figure 4:
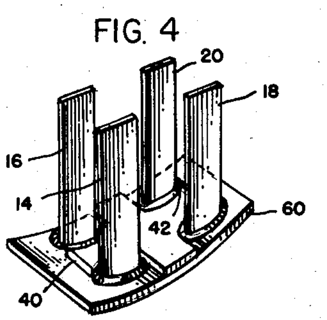
FIG. 4 is a perspective view of the underside of my assembled magnetic recorder head.
Figure 2:
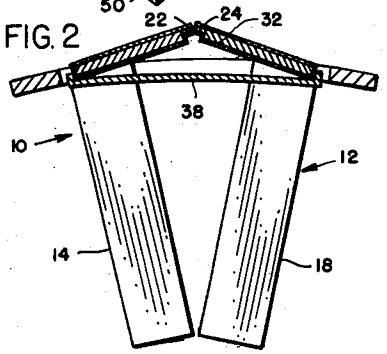
FIG. 2 is a cross sectional side elevational view of the parts of my magnetic recorder head prior to positioning in final assembled relationship.

Referring now to the drawngs where several specific embodiments of my invention are illustrated, FIG. 1 shows the principal component parts of my magnetic tape recorder head ready for what is essentially a three part primary assembly. Two identical substantially J-shaped Mu-metal or magnetic pole pieces 10 and 12 are shown in their correct relationship with respect to each other prior to assembly with the brass supporting member 40 with arrows showing where the core arms go when making the complete assembly. Two parallel core arms 14 and 16, and 18 and 20 extend from each of the pole shoes 56 and 58, respectively.

Figure 3:
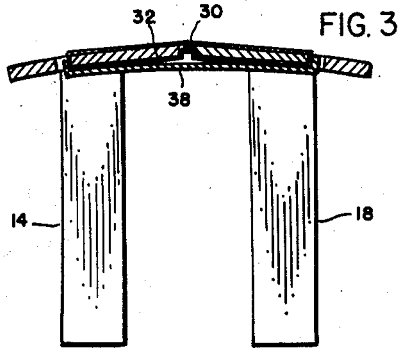
FIG. 3 is a cross sectional side elevational view of my magnetic recorder head wherein the parts are assembled in their respective final positions.

The poles which comprise a flat shoe portion 56 and 58 with thin toe portions 22 and 24 at their contacting edges and the core arms extending parallel with each other from the sides of the shoes at the heels thereof are readily stamped and shaped from strip or laminate stock of soft magnetic iron or other suitable Mu-metal core material. The toes or gap edges shown at 22 and 24 on the pole shoes are oriented to ultimately face each other in spaced relation as more clearly illustrated in cross-sectional views, FIGS. 3, 5 and 6, where it will be noted that the edges are elongated planar surfaces, narrower than the thickness of the strip stock as coined from the main body of the pole by indentations or offsets 26, 27 to a thickness close to .010". The facing surfaces of the gap faces are machined to flat planes to be disposed parallel with each other and then coated, with a metal film 32 of a low magnetic permeability material such as copper to a thickness preferably less than .0005". The metal film 32 may be deposited on the poles by means of electro plating, vapor deposition or other means and although the important area is the gap edge, the remainder of the pole pieces surface can also be covered for protective and soldering purposes. The film thickness controls the magnetic gap width dimensions; hence the dimensions of magnetic gap desired in any particular application determines the thickness and if only one edge is plated the thickness thereof determines the gap. Dimensions of only a few microns, thickness, for instance, may be obtained by controlled plating methods it being appreciated that microscopic gaps can be attained by merely plating one of the gap edges instead of both. In the present invention both edges are plated for a gap of approximately .001".

Each pole piece 10 and 12 is provided with lateral notches 34 on the shoes 56 and 58 so that the pole cores 14, 16, 18 and 20 may be bent downwardly without disturbing the flatness of the shoes behind the gap edges. Also each pole piece 10 and 12 is provided with a recess 36 at the heel of the pole shoes opposite the gap edges at a predetermined distance therefrom. These recesses 34 on the shoes are adapted to cooperate with the clamping or spacer plate 38 whereby they are held in place.

The spacer plate 38 is prepared from a flat non-magnetic metal sheet of such material as brass. It is preferably shaped in the form of a symmetrical cross, arched upwardly at the center. The ends of the longer cross member form tongues 40 the free ends of which are turned upwardly to form two small lugs 42. The lugs 42 engage the recesses 36 and lock the plated gap edges in contact with each other under moderate pressure, the normal distance between the lugs 42 being slightly less than the combined lengths of the shoes between the recesses 36.

In the embodiment shown in FIGS. 1–4*a* frame 44, provided with a rectangular opening therein cooperates with the spacer plate 38 to hold the core arms 14, 16, 18 and 20 in place between them when the spacer plate and pole pieces are laid thereon, as is shown most clearly in FIGS. 1 to 4. In providing this the widths of the cross arms in relation to the dimensions of the opening results in openings 48, 50, 52 and 54 through which the core arms 14, 16, 18 and 20 respectively are received and held in place.

Figures 5, 6, 7, 8:
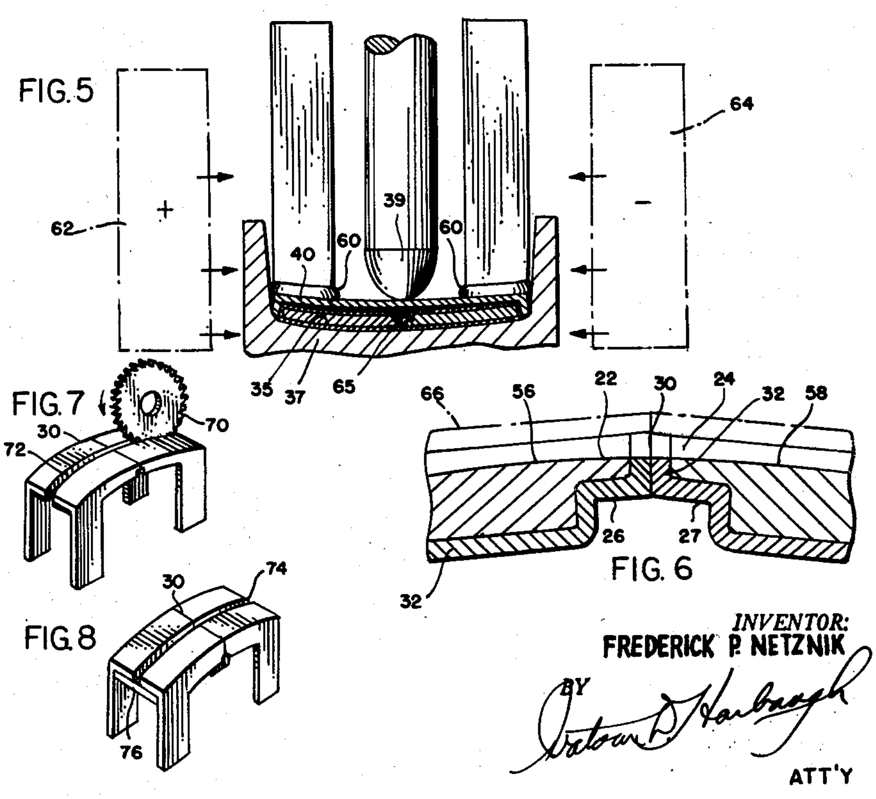
FIG. 5 is a cross sectional view of my magnetic recorder head assembly illustrating the preferred clamping relationship of the parts and the solder technique.
FIG. 6 is a fragmentary view of the cross section of FIG. 3 about the region of the magnetic gap.
FIG. 7 is a perspective view of the method and result of cutting the head with two matched monaural heads.
FIG. 8 is a perspective view of the head slit only through the Mu-metal to provide a double track head for stereophonic reproduction.

In the embodiment shown in FIG. 5, the core poles are lowered into a cavity 35 of a die block 37 with their heels up and their toes together and down to be the first to touch the bottom of the cavity. The plate 40 being in place the nose 39 of a clamp fixture is lowered to force the shoes into contact with the bottom of the cavity to wedge the gap edges together. Thereafter both of the assemblies described are subjected to soldering heat, preferably by induction heating of a 1 kw. machine and rings or chips of solder and flux which are slipped onto or next to the core arms melt and flow into all interstices to make of the shoe or head portion a solid mass of metal. Although silver solder can be used, it has been found that soft solder is adequate under all working conditions and better gap characteristics are maintained, and the manufacturer thereby is subjected to less expense on this step. The melting point of the solder (approximately 500° F.) need only be above the flowing temperature of any subsequent soldering or the epoxy resin later cast around the core arms.

When solder rings 60 are used as shown in FIG. 5 they comprise small toroidal masses of solder which are slipped over the core arms 14, 16, 18 and 20 and melted placing the entire magnetic head assembly between two poles 62 and 64 of high frequency induction heating machine. The solder is melted and flows into all the crevasses and spaces around the core arms to fill same as at 65.

Thereafter, the working face of the shoes is ground down with approximately a 1" radius where the approximate assembled radius is 1.125". A fine grinding wheel is used and oscillated axially to eliminate carry over of Mu-metal with the gap. The depth of grinding is gaged from the working face of the gap and the gap edges are ground down preferably to a gap thickness of .0035" to .0045". With the original coined gap thickness of .101 sufficient stock is removed from the face of the stamped shoe to produce sharp squared edges at the gap and a completely finished shoe face.

Thereafter the outside edges of the core arms and the heel edge of the shoe are preferably ground off slightly to remove the copper plating thereon to eliminate the shorted turn of low resistance metal around the core arms which might produce the effect of a shorted transformer secondary winding. The grinding of the shoe face as described has already done the same for the shoe.

In the event the embodiment shown in FIGS. 1–4 is employed the frame is slotted out as indicated at broken lines 80 in FIG. 1 after the soldering operation to eliminate the secondary transformer winding effect with respect thereto. The space left thereby will be filled with epoxy resin and cured before grinding. The machined assembly is then preferably embedded in a thermosetting plastic such as generally referred to as Bakelite. The appropriate coils also preferably being cast integrally therein. However, the Bakelite body, with suitable contours for fastening may have the coils in them and apertures provided so that the fused assembly is removable if desired.

The last three steps may be changed in order if desired but the dressing off of the copper on the core arms should precede the application of the plastic.

As will be noted the frame 44 and the spacer plate 38 are slightly curved convexly in a direction transverse to the gap edges. The purpose of this curved construction is to expose a convex shoe surface 56 and 58 across which the moving magnetic tape is passed. By slightly beveling the plane of the spacer plate 38 and frame 44 the upper surfaces 56 and 58 of the poles are more readily exposed to the moving magnetic tape.

The surfaces 56 and 58 of the poles are subject to abrasion and wear as the magnetic tape passes thereacross. Moreover, it is important in order to obtain the highest resolution when reproducing the signal from the magnetic tape that the tape move across the gap with a constant dimensional relationship to the gap. The abrasion is reduced to a minimum and uniform contact with the moving tape is improved by further polishing the working face after grinding the upper surfaces 56 and 58 of the poles, particularly in the region about the gap 30. FIG. 6 illustrates in cross section view the end result desired for the poles after grinding and polishing. The phantom line 66 indicates the height of the metal prior to finishing.

Whenever the completed head is to be used for monaural recording and reproducing, particularly with a two-way or reversing direction tape recorder, the head is split apart by a fine metal saw 70 along the kerf line 72 as shown in FIG. 7 in a direction normal to the gap. Thus, two matching heads of identical characteristics are provided.

However, if the completed head is to be used for stereophonic operation, the head is merely slit through the Mu-metal from the working face surface as at 74 leaving the non-magnetic metal as integrated upporting web structure at 76. Here again, two heads are provided of identical characteristics and their gaps are perfectly aligned for maximum resolution of stereo tracks.

The foregoing illustrations and specification of a specific embodiment of my invention and the specific methods of manufacture thereof are merely illustrative of my invention; the scope of my invention is set forth in the following claims.

What is claimed is:

1. A magnetic tape recorder head assembly comprising two opposing pole pieces of high magnetic permeable material, each pole piece having a flat tape engaging shoe portion with its gap face surface coated with a film of material of low magnetic permeability, said pole pieces having two flat substantially parallel core arms extending therefrom and located in a plane disposed transversely to said gap face surface, a spacer plate of low magnetic permeability holding the pole pieces in fixed relationship with said coated gap faces and including means urging said pole pieces into contact with each other, and a fuse metal of low magnetic permeability holding said pole pieces and spacer plate in an integrated unitary assembly.

2. The combination called for in claim 1 including a frame member means supporting said spacer plate and closely fitting the contour of said core arms in supported relationship adjacent to said pole pieces for holding said pole pieces and spacer plate in a predetermined fixed relationship.

References Cited in the file of this patent

UNITED STATES PATENTS

| | | |
|---|---|---|
| 2,674,031 | Buhrendorf | Apr. 6, 1954 |
| 2,674,659 | Buhrendorf | Apr. 6, 1954 |
| 2,676,392 | Buhrendorf | Apr. 27, 1954 |
| 2,677,019 | Buhrendorf | Apr. 27, 1954 |
| 2,850,582 | De Raemy | Sept. 2, 1958 |

FOREIGN PATENTS

| | | |
|---|---|---|
| 181,974 | Austria | May 10, 1955 |
| 1,121,583 | France | Aug. 21, 1956 |
| 136,768 | Sweden | July 29, 1952 |